US007866615B2

(12) United States Patent
Hsuan et al.

(10) Patent No.: US 7,866,615 B2
(45) Date of Patent: Jan. 11, 2011

(54) DISPLAY SUPPORT DEVICE

(75) Inventors: Michael Hsuan, Wanchai (HK); Bin Liu, Wanchai (HK); Kaiml Lei, Wanchai (HK)

(73) Assignee: Top Victory Investments Limited, Wanchai (HK)

( * ) Notice: Subject to any disclaimer, the term of this patent is extended or adjusted under 35 U.S.C. 154(b) by 112 days.

(21) Appl. No.: 12/049,624

(22) Filed: Mar. 17, 2008

(65) Prior Publication Data

US 2008/0258030 A1  Oct. 23, 2008

(30) Foreign Application Priority Data

Apr. 18, 2007 (TW) ............................... 96206194 U
May 4, 2007 (TW) ............................... 96207153 U

(51) Int. Cl.
*A47B 91/00* (2006.01)
*F16M 11/20* (2006.01)
*F16M 13/00* (2006.01)
*F16M 1/00* (2006.01)
*F16M 3/00* (2006.01)
*F16M 5/00* (2006.01)
*F16M 7/00* (2006.01)
*F16M 9/00* (2006.01)
*F16M 11/00* (2006.01)
*A47F 5/00* (2006.01)
*E04G 25/00* (2006.01)
*A47G 1/24* (2006.01)

(52) U.S. Cl. .................. 248/188.8; 248/351; 248/354.1; 248/673; 248/454; 248/917; 248/919; 248/920; 248/922; 248/923; 248/688; 361/679.05; 361/679.2; 361/679.21

(58) Field of Classification Search ............ 248/346.03, 248/188.8, 351, 354.1, 673, 676, 677, 454, 248/917, 919, 920, 922–924, 462, 688, 472; 403/109.1, 109.2, 109.4; 361/679.05, 679.21, 361/679.2, 679.01, 679.02; 40/607.04
See application file for complete search history.

(56) References Cited

U.S. PATENT DOCUMENTS

| 2,791,441 | A * | 5/1957 | Phillips ...................... 280/302 |
| 5,881,979 | A * | 3/1999 | Rozier et al. ............. 248/188.5 |
| 6,570,627 | B1* | 5/2003 | Chang ........................ 348/794 |
| 7,159,771 | B2* | 1/2007 | Singgih et al. ............. 235/383 |
| 7,478,784 | B2* | 1/2009 | Wang ......................... 248/161 |
| 7,566,043 | B2* | 7/2009 | Chen .......................... 248/616 |
| 2002/0003198 | A1* | 1/2002 | Hsieh et al. ................ 248/351 |
| 2002/0084390 | A1* | 7/2002 | Parisi et al. ............. 248/188.8 |
| 2004/0084588 | A1* | 5/2004 | Liu et al. ................. 248/291.1 |
| 2005/0001114 | A1* | 1/2005 | Ogawa ....................... 248/127 |
| 2005/0040311 | A1* | 2/2005 | Lee ............................ 248/454 |
| 2005/0236533 | A1* | 10/2005 | McRight et al. ............ 248/161 |

(Continued)

*Primary Examiner*—Terrell Mckinnon
*Assistant Examiner*—Christopher Garft
(74) *Attorney, Agent, or Firm*—Baker & Daniels LLP

(57) ABSTRACT

A display support device includes a connecting member and a lower tube. The connecting member is adapted to be mounted on a rear surface of a flat display, and includes an upper tube. The lower tube is disposed below the upper tube. One of the upper and lower tubes has an internally threaded portion, and the other of the upper and lower tubes has an externally threaded portion engaging the internally threaded portion to allow for rotation and therefore movement of the lower tube relative to the upper tube, which results in a change to the total length of the upper and lower tubes.

3 Claims, 18 Drawing Sheets

U.S. PATENT DOCUMENTS

2005/0247839 A1* 11/2005 Huang ................... 248/309.1
2005/0263660 A1* 12/2005 Hsiung ................... 248/291.1
2006/0231701 A1* 10/2006 Ishii et al. ............... 248/188.8
2007/0075208 A1*  4/2007 Chen ...................... 248/455

* cited by examiner

DISPLAY SUPPORT DEVICE

CROSS-REFERENCE TO RELATED APPLICATION

This application claims priority of Taiwanese Application Nos. 096206194 and 096207153, filed on Apr. 18, 2007 and May 4, 2007, respectively.

BACKGROUND OF THE INVENTION

1. Field of the Invention

This invention relates to a display support, and more particularly to a display support device for supporting a flat display.

2. Description of the Related Art

Referring to FIGS. 1, 2, and 3, a flat display 11 of a first conventional display apparatus 1 is supported on a surface (not shown) by a display support device. The display support device is configured as a metal support frame 12 disposed on a rear surface of the flat display 11. The flat display 11 is configured with a front support frame 111 disposed at a front side thereof, and a rotating shaft unit 13. The rotating shaft unit 13 includes a metal frame body 131 anchored to the rear surface of the flat display 11, a pivot bolt 132, a sleeve 133, and a torsion spring 134. The pivot bolt 132 has a bolt body 135 extending through the metal support frame 12 and the metal frame body 131. The sleeve 133 is sleeved on the bolt body 135, and is disposed between and in contact with the metal support frame 12 and the metal frame body 131. The torsion spring 134 is sleeved on the sleeve 133, and has two ends 136 fixed respectively within positioning holes 137, 121 in the metal frame body 131 and the metal support frame 12. A washer 138 is sleeved on an end portion of the bolt body 135 proximate to the metal frame body 131. A nut 139 engages threadably the bolt body 135, and is tightened to press a head 140 of the pivot bolt 132 against the metal support frame 12 to thereby confine the sleeve 133 and the torsion spring 134 between the metal support frame 12 and the metal frame body 131.

As such, the metal support frame 12 is rotatable about the pivot bolt 132 to a desired position so as to adjust the inclination angle of the flat display 11. However, since the frame body 131, the pivot bolt 132, the sleeve 133, and the torsion spring 134 of the rotating shaft unit 13 are made of metal, the manufacturing costs of the first conventional display apparatus 1 are increased.

Referring to FIG. 4, a flat display 21 of a second conventional display apparatus 2 is supported on a surface (not shown) by another display support device including a base 23, a support frame 24, and a mounting tray 25. The support frame 24 includes a fixed hollow frame body 241 having a lower end connected fixedly to the base 23, a movable frame body 242 disposed slidably within the fixed frame body 241, a metal biasing member 243, and two fill plates 244. The fill plates 244 flank the movable frame body 242, and are disposed between the fixed frame body 241 and the movable frame body 242. The biasing member 243 is configured as a constant force spring, and includes a wound portion 245 attached to a lower end of the movable frame body 242, and a fixed end 246 fastened to a top end of the fixed frame body 241. Due to the presence of the biasing member 243, after a force is applied to move the movable frame body 242 to a desired height relative to the fixed frame body 242, and when the force is released, the movable frame body 242 can be maintained at the desired height. Two pivots 26 cooperate with a U-shaped plate 27 to connect the mounting tray 25 to the movable frame body 242. The display 21 is mounted to the mounting tray 25.

Since the biasing member 243 is made of metal, the manufacturing costs of the second conventional display apparatus 2 are also increased.

SUMMARY OF THE INVENTION

The object of this invention is to provide a display support device for supporting a flat display, which can be made at a low cost.

According to this invention, a display support device includes a connecting member and a lower tube. The connecting member is adapted to be mounted on a rear surface of a flat display, and includes an upper tube. The lower tube is disposed below the upper tube. One of the upper and lower tubes has an internally threaded portion, and the other of the upper and lower tubes has an externally threaded portion engaging the internally threaded portion to allow for rotation and therefore movement of the lower tube relative to the upper tube, which results in a change to the total length of the upper and lower tubes.

The upper and lower tubes may be made of a plastic material to reduce the manufacturing costs of the display support device.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
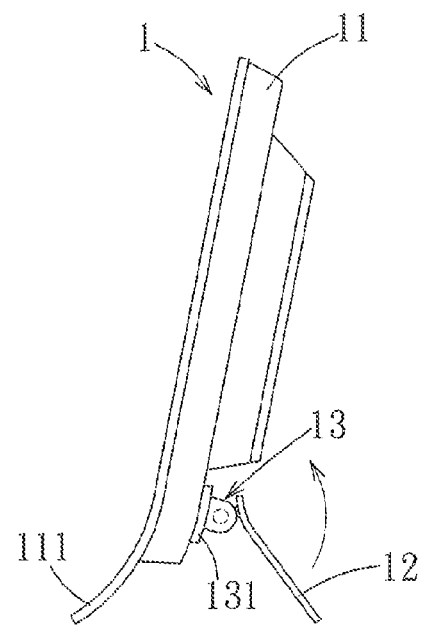
FIG. 1 is a side view of a first conventional display apparatus.
Figure 2:
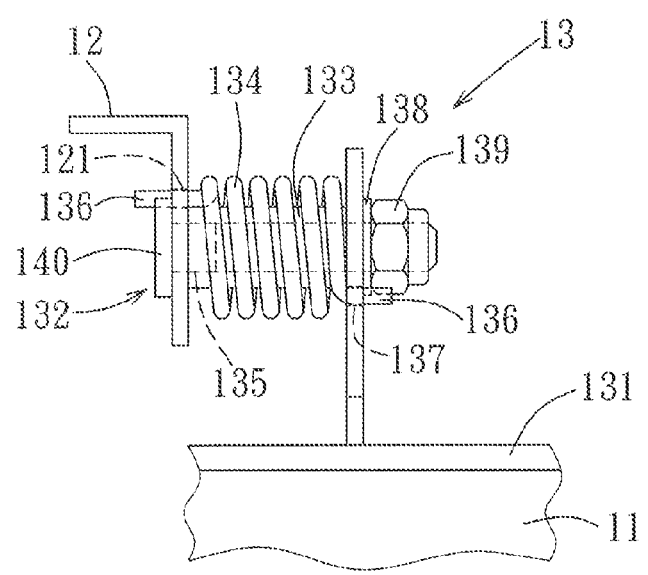
FIG. 2 is a fragmentary schematic view of the first conventional display apparatus.
Figure 3:
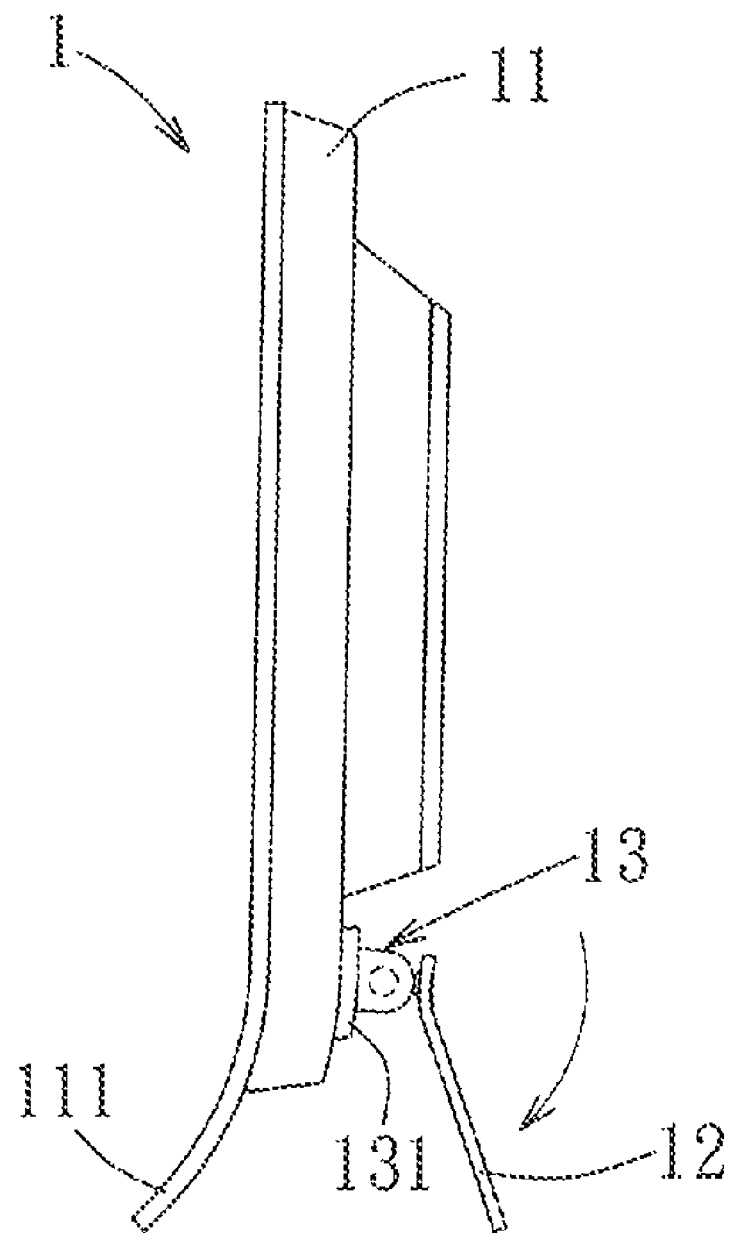
FIG. 3 is a view similar to FIG. 1 but illustrating how the inclination angle of a flat display is adjusted.
Figure 4:
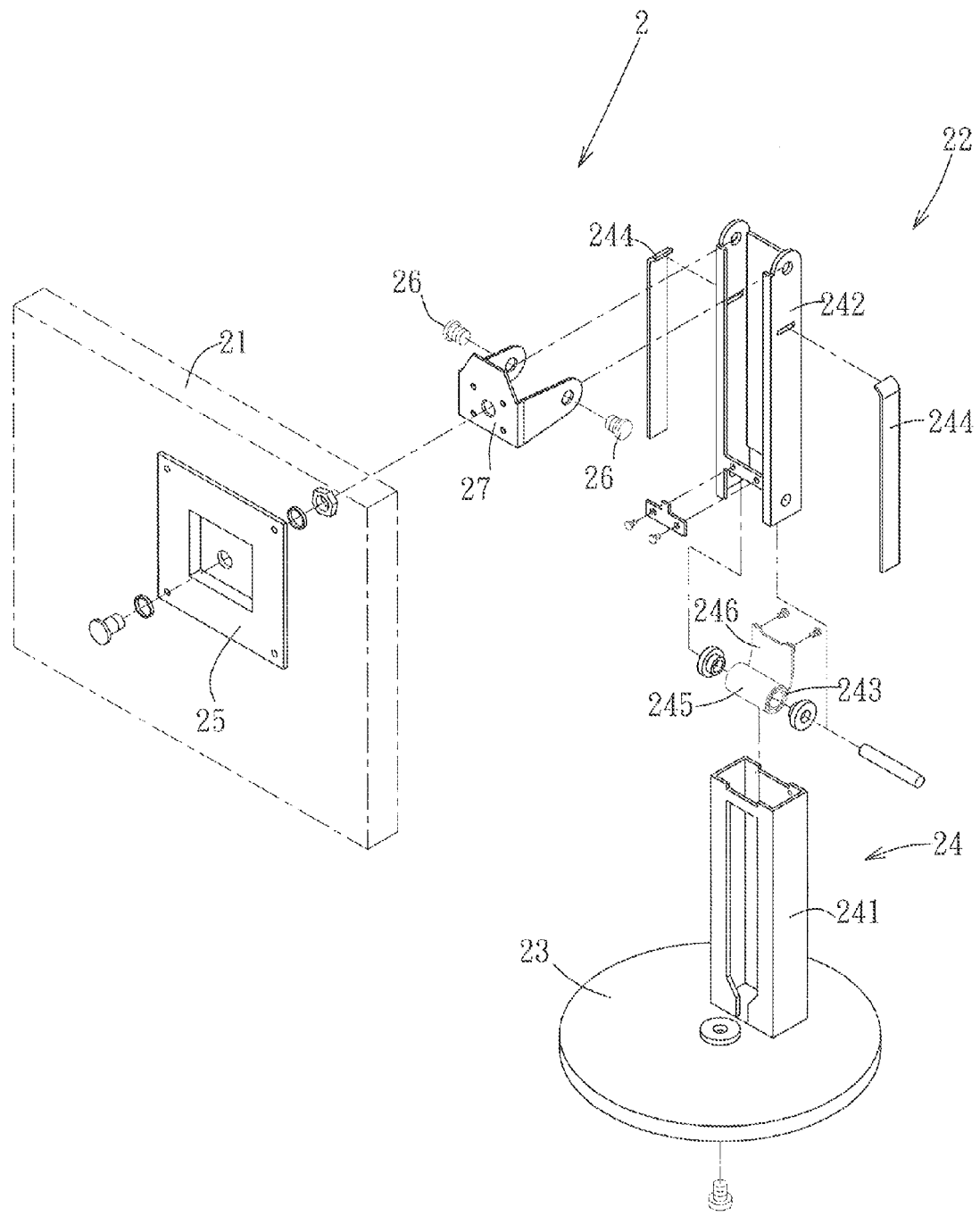
FIG. 4 is an exploded perspective view of a display support device of a second conventional display apparatus.
Figure 5:
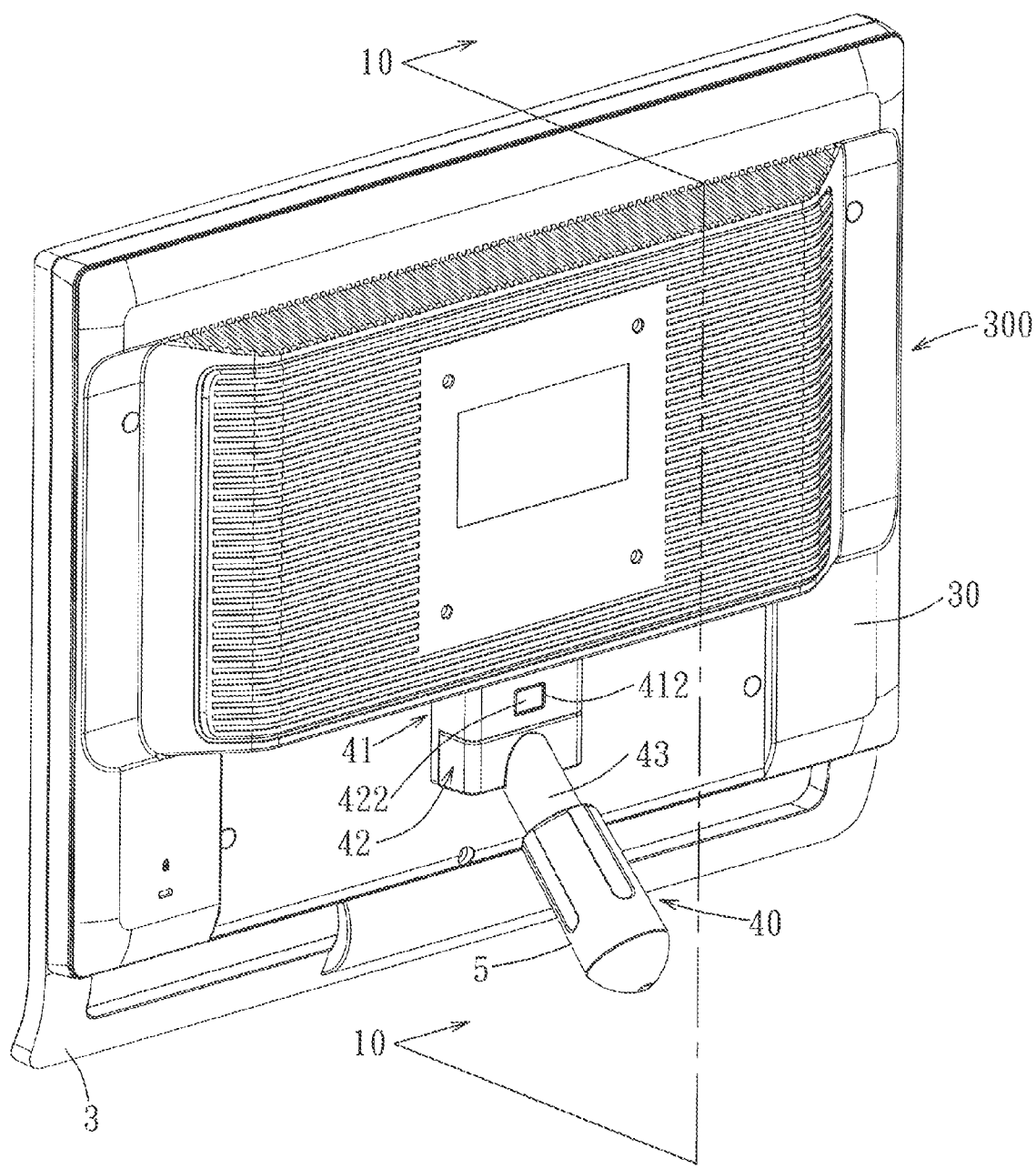
FIG. 5 is an assembled perspective view of a display apparatus including a flat display and the first preferred embodiment of a display support device according to this invention.

Referring to FIG. 5, the first preferred embodiment of a display support device 40 according to this invention forms a portion of a display apparatus 300, and is used to support a flat display 30 of the display apparatus 300, such as a plasma display and an LCD (liquid crystal display).

Figure 6:
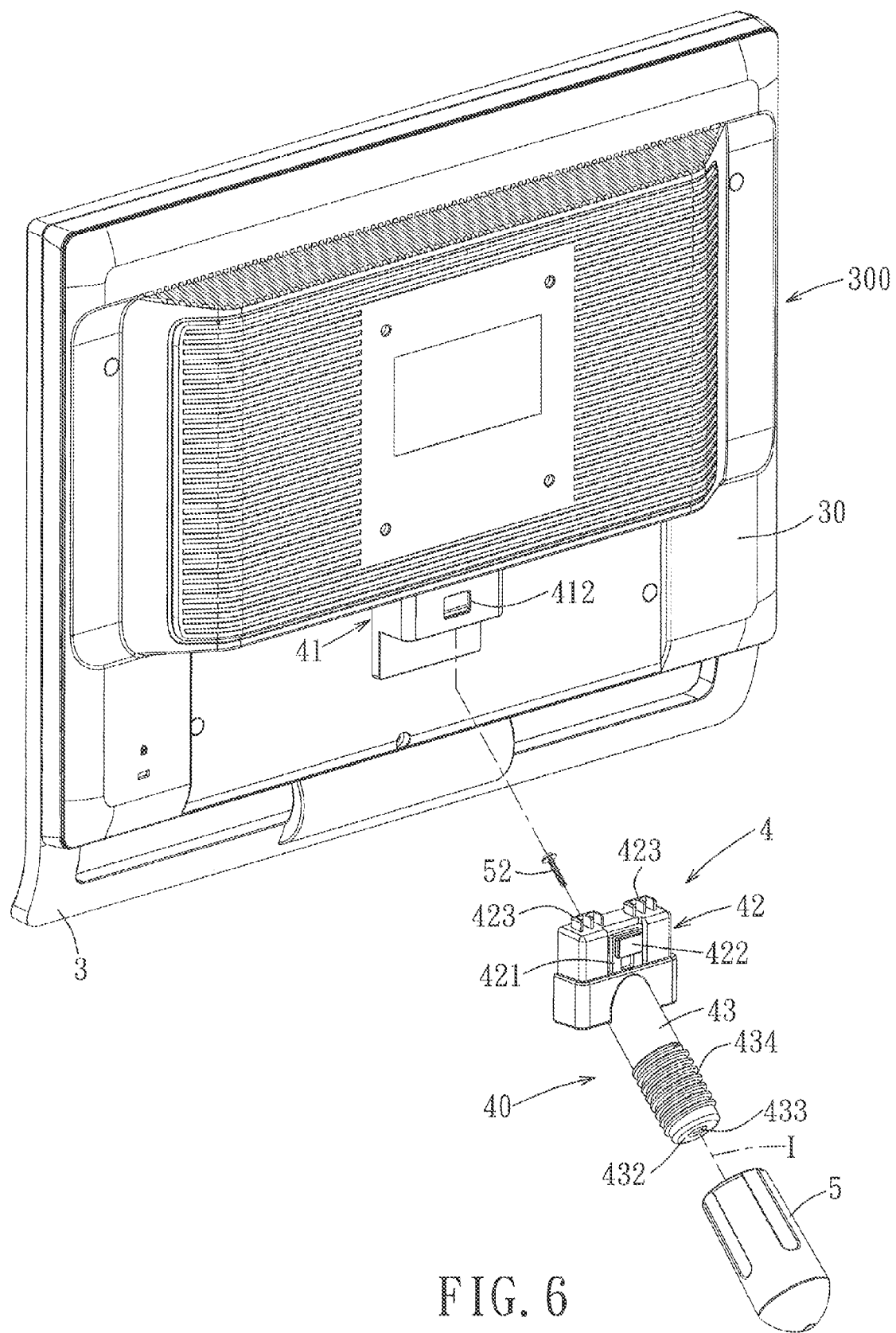
FIG. 6 is a partly exploded perspective view of the display apparatus of FIG. 5.
Figure 7:
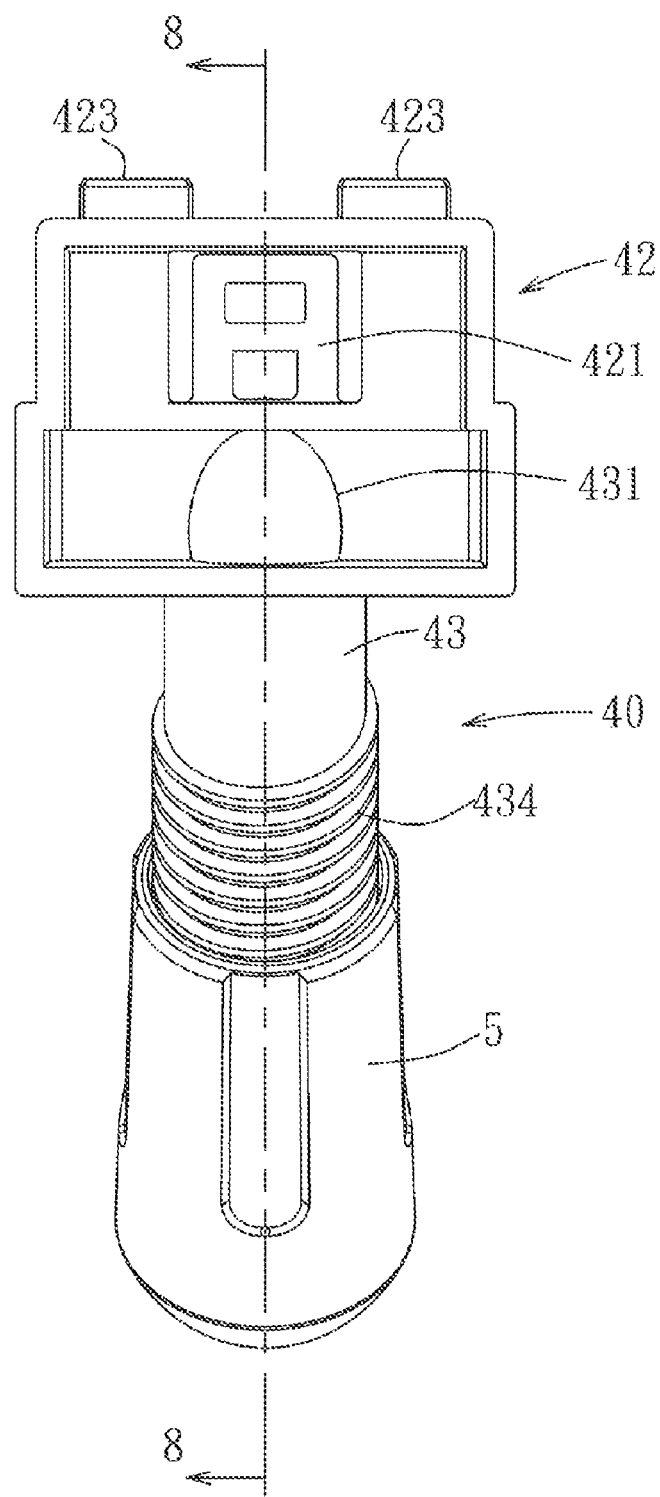
FIG. 7 is a front view of a second mounting seat of a connecting member, and upper and lower tubes of the first preferred embodiment.
Figure 8:
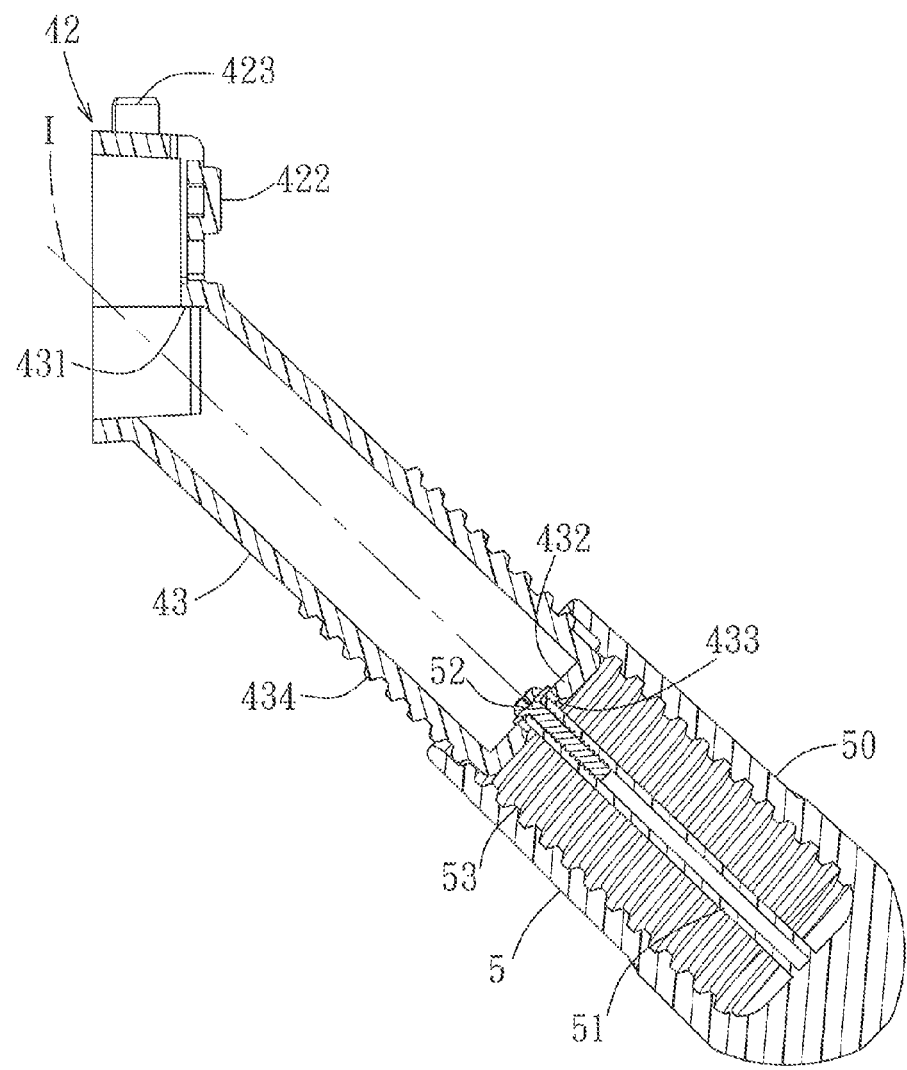
FIG. 8 is a sectional view taken along Line 8-8 in FIG. 7.
Figure 9:
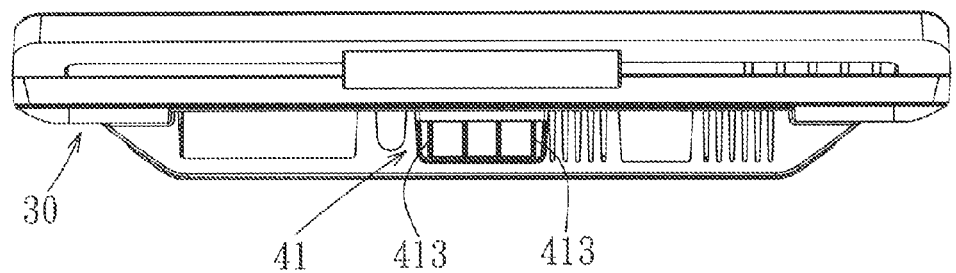
FIG. 9 is a top view of the first mounting seat of the connecting member of the first preferred embodiment and the flat display.

With further reference to FIGS. 6, 7, and 8, the display support device 40 includes a plastic connecting member 4 and a plastic lower tube 5. The connecting member 4 includes a first mounting seat 41, a second mounting seat 42, and an upper tube 43. The first mounting seat 41 is connected fixedly to a rear surface of the flat display 30, and has an insert hole 411 (see FIG. 10), a rectangular positioning hole 412 disposed behind and in spatial communication with the insert hole 411, and two guide holes 413 (see FIG. 9) disposed above and in spatial communication with the insert hole 411.

The second mounting seat 42 includes an open front side, an integral resilient plate 421, a pushbutton 422, and two guiding projections 423. The pushbutton 422 is disposed fixedly on the resilient plate 421, and extends into the positioning hole 412 in the first mounting seat 41 so as to prevent removal of the second mounting seat 42 from the first mounting seat 41. The pushbutton 422 can be pressed to separate from the positioning hole 412 in the first mounting seat 41 so as to allow for removal of the second mounting seat 42 from the first mounting seat 41. The guide projections 423 are disposed at a top end of the second mounting seat 42, and are engageable respectively within the guide holes 413 in the first mounting seat 41 for facilitating assembly of the second mounting seat 42 to the first mounting seat 41.

The upper and lower tubes 43, 5 are inclined. The upper tube 43 extends rearwardly and downwardly from the rear surface of the flat display 30, and has an upper end opening 431 and a lower end wall 432 formed with a hole 433 in spatial communication with the upper end opening 431. The lower tube 5 includes a tube body 50, an insert rod 51 formed integrally in the tube body 50, extending through the hole 433 in the lower end wall 432 of the upper tube 43, and having a distal end disposed within the tube body 50, and a retaining member 52 mounted removably to the distal end of the insert rod 51 to prevent removal of the insert rod 51 from the lower end wall 432 of the upper tube 43. In this embodiment, the distal end of the insert rod 51 is internally threaded, and the retaining member 52 is configured as a headed bolt. The upper tube 43 further has an externally threaded lower end 434 engaging an internally threaded portion 53 of the lower tube 5. As such, the lower tube 5 can be rotated and therefore moved relative to the upper tube 43 to adjust the total length of the upper and lower tubes 43, 5 to thereby change the inclination angle of the flat display 30.

Figure 10:
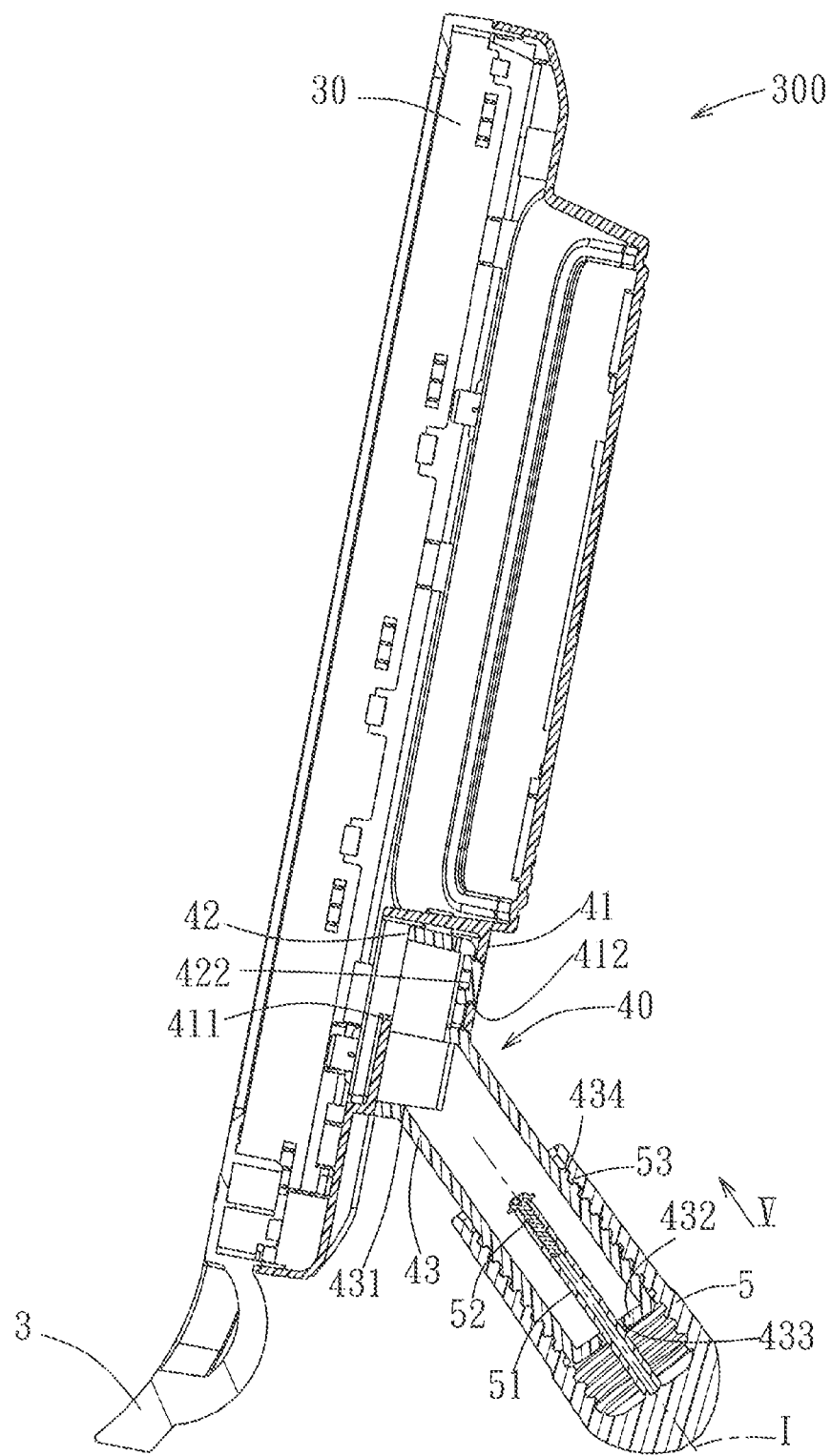
FIG. 10 is a sectional view taken along Line 10-10 in FIG. 5.
Figure 11:
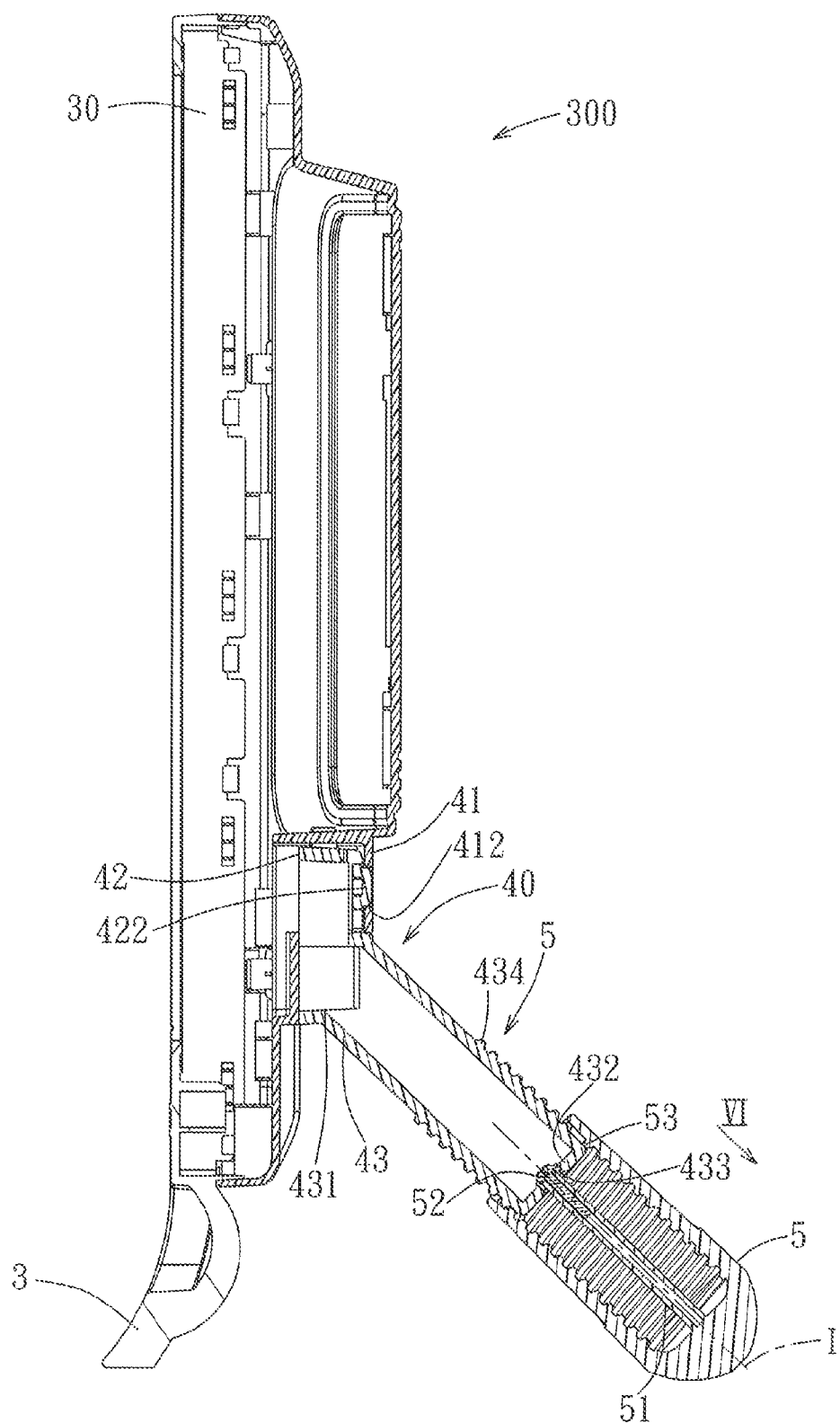
FIG. 11 is a view similar to FIG. 10 but illustrating how a lower tube of the first preferred embodiment is operable to adjust the inclination angle of the flat display.
Figure 12:
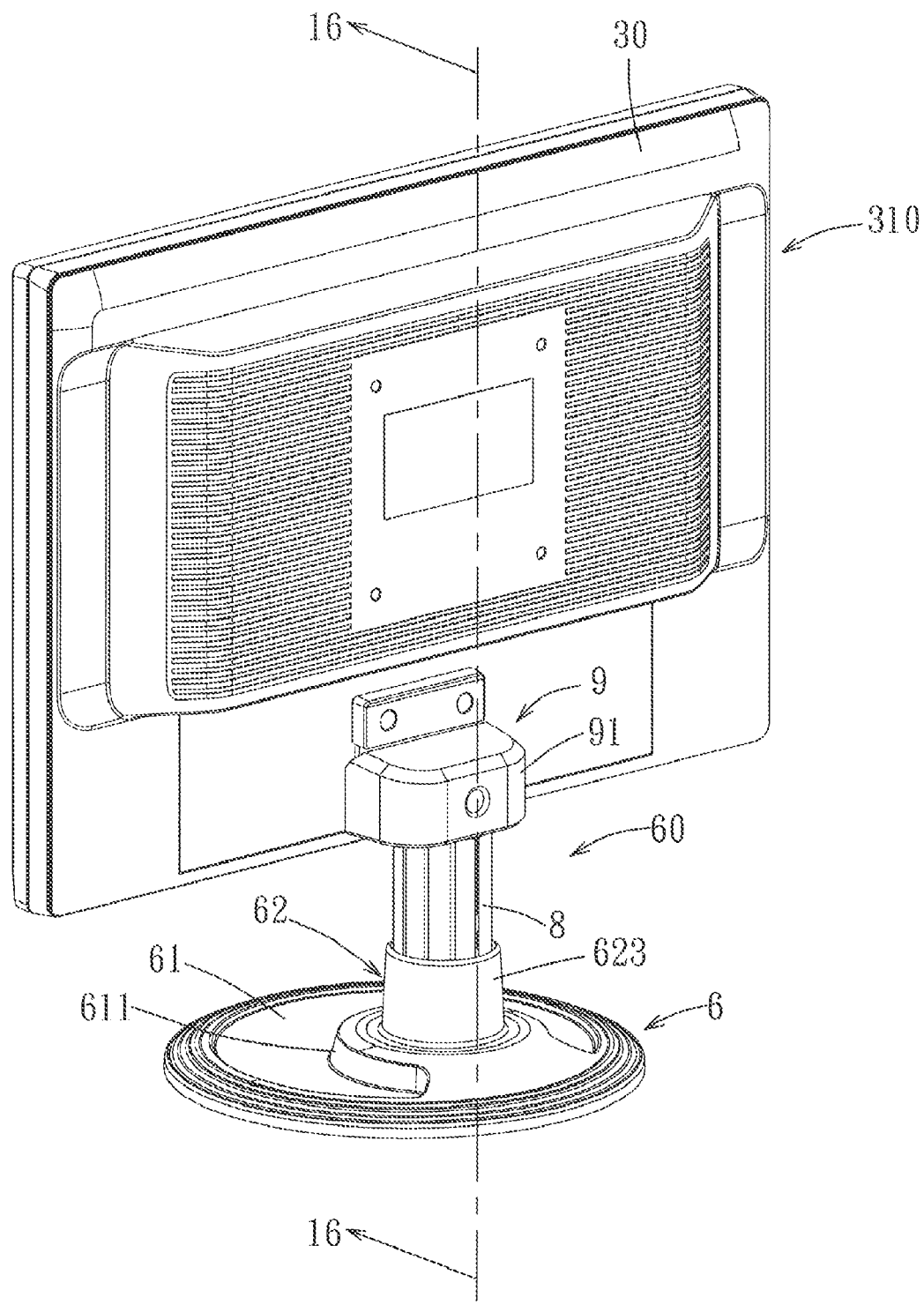
FIG. 12 is an assembled perspective view of a display apparatus including a flat display and the second preferred embodiment of a display support device according to this invention.
Figure 13:
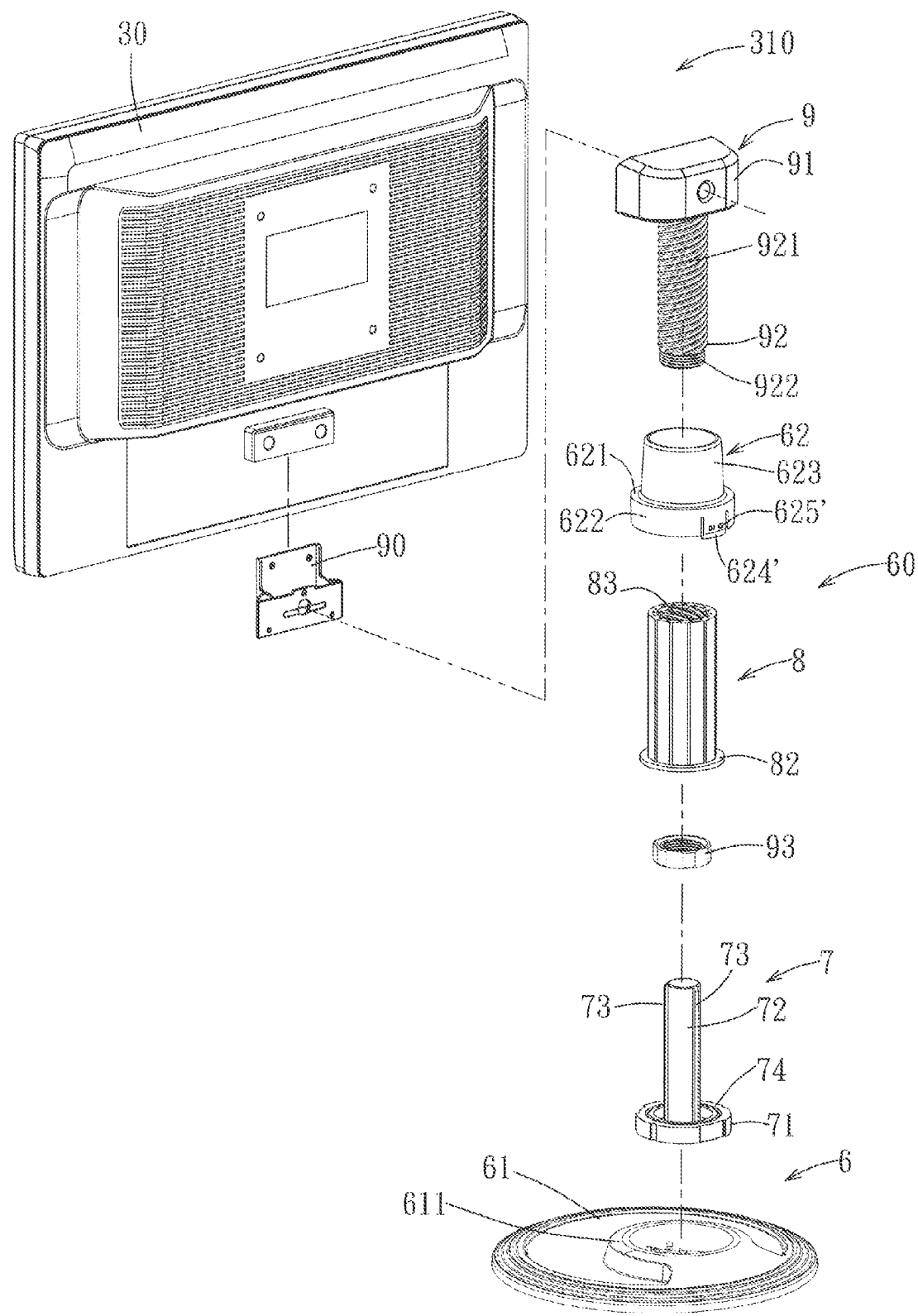
FIG. 13 is an exploded perspective view of the display apparatus of FIG. 12.
Figure 14:
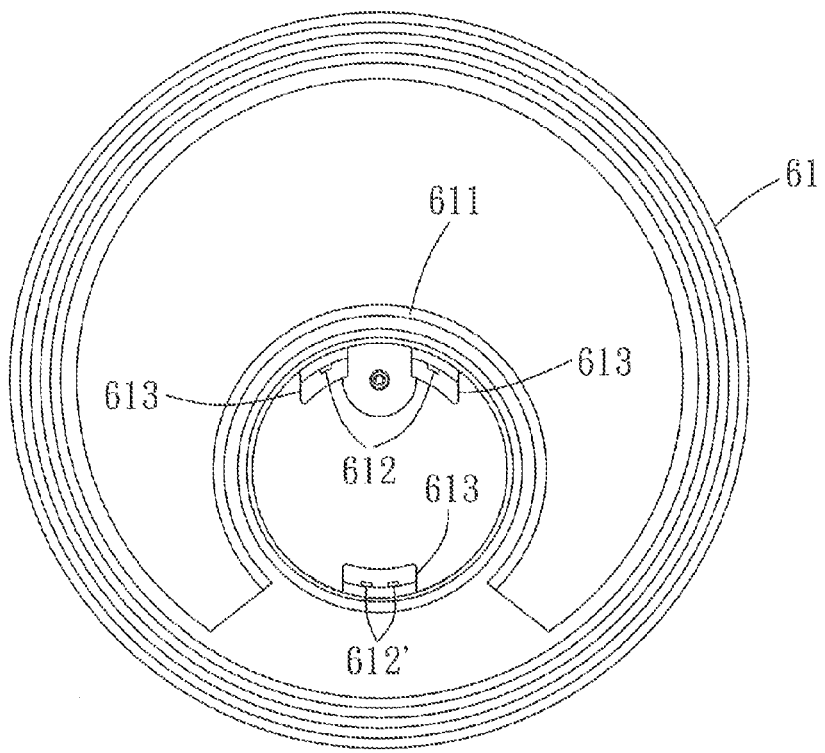
FIG. 14 is a top view of a base body of a base of the second preferred embodiment.
Figure 15:
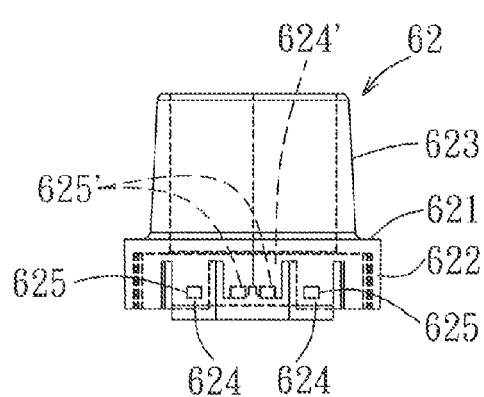
FIG. 15 is a front view of a retaining sleeve of the base of the second preferred embodiment.

With reference to FIGS. 10 and 11, during use, the flat display 30 is supported on a surface (not shown) by the lower tube 5 and a front support frame 3 disposed fixedly on a front side of the flat display 30. The lower tube 5 can be rotated relative to the upper tube 43 to thereby move relative to the same along an axis (I). When the lower tube 5 is moved relative to the upper tube 43 toward the flat display 30 in a direction shown by the arrow (V) in FIG. 10, the flat display 30 is pivoted rearwardly. When the lower tube 5 is moved relative to the upper tube 43 in an opposite direction shown by the arrow (VI) in FIG. 11, the flat display 30 is pivoted forwardly.

Since each component of the connecting member 4 and the lower tube 5 is made of a plastic material, the display support device 40 is manufactured at a low cost. Furthermore, to remove the second mounting seat 42 from the first mounting seat 41, it is only necessary to press the pushbutton 422, thereby resulting in convenience during use of the flat display 30.

With reference to FIGS. 12, 13, 14, and 15, the second preferred embodiment of a display support device 60 according to this invention also includes a plurality of plastic components. The plastic components include a base 6, a fixed member 7, a vertical lower tube 8, and a connecting member 9. The base 6 includes a base body 61 and a vertical retaining sleeve 62 having a lower end connected removably to the base body 61. The base body 61 has a top surface formed with a generally C-shaped projection 611, two front retaining hooks 612, and two rear retaining hooks 612'. The retaining sleeve 62 has a horizontal ring plate portion 621, a vertical lower tubular portion 622, and a vertical upper tubular portion 623. The lower tubular portion 622 is disposed under the upper tubular portion 623, and has a diameter greater than that of the same. The ring plate portion 621 has an inner periphery connected integrally to a lower end of the upper tubular portion 623, and an outer periphery connected integrally to an upper end of the lower tubular portion 622. The lower tubular portion 622 is formed with two front resilient plates 624, and a rear resilient plate 624' disposed behind the front resilient plates 624. The front and rear resilient plates 624, 624' extend respectively through three retaining grooves 613 in the C-shaped projection 611. Each of the front resilient plates 624 has a hole 625. The rear resilient plate 624' has two holes 625'.

Figure 16:
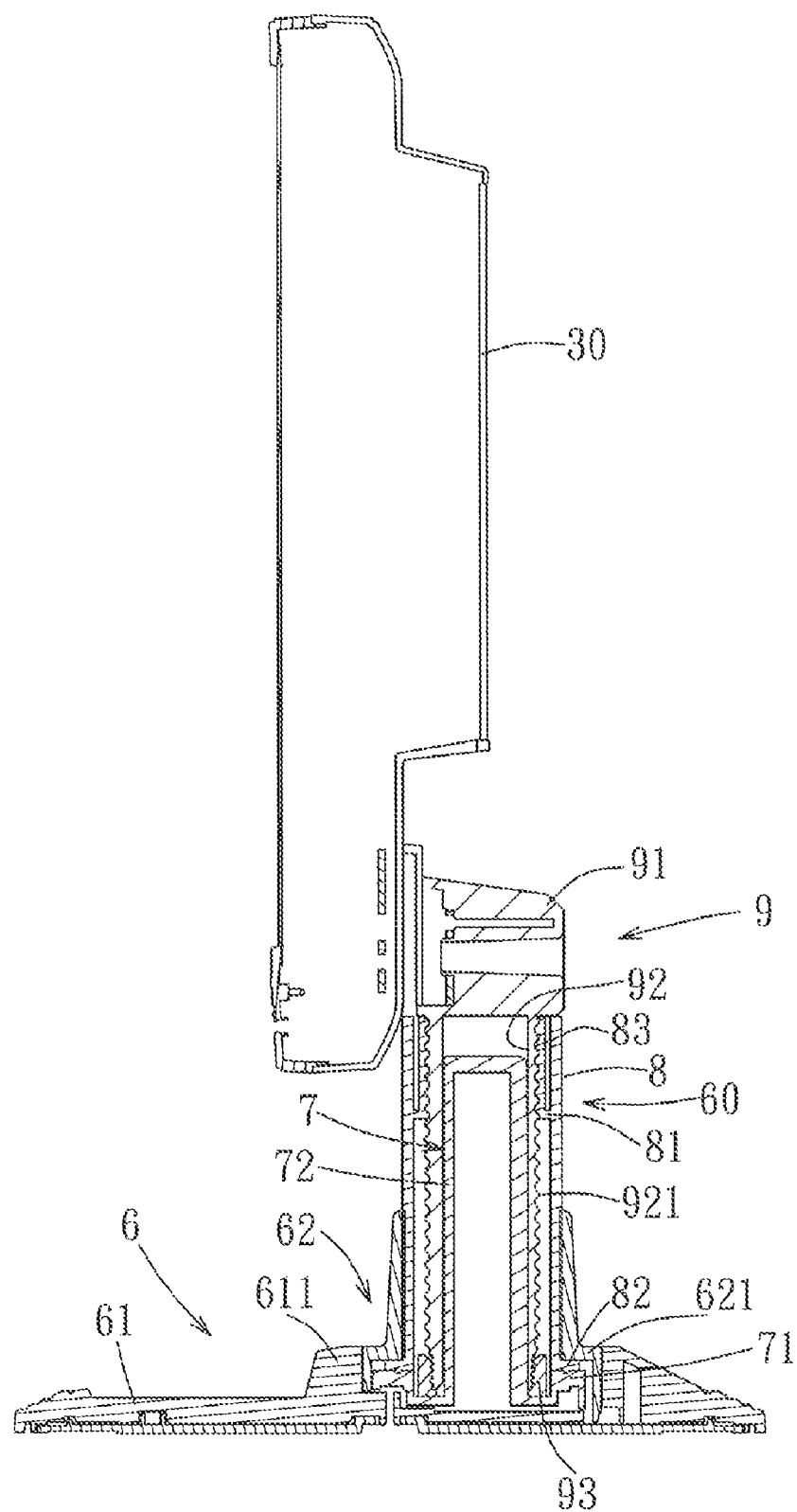
FIG. 16 is a sectional view taken along Line 16-16 in FIG. 12.
Figure 17:
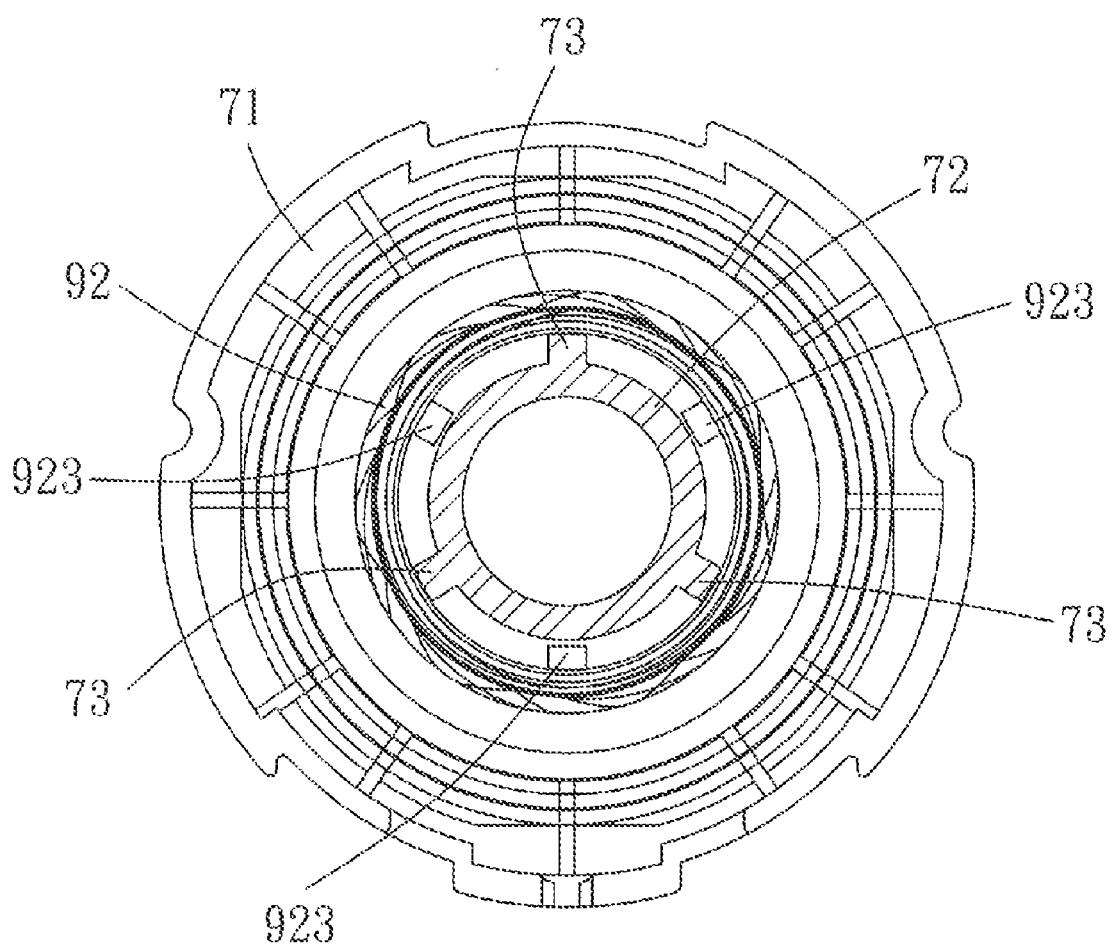
FIG. 17 is a fragmentary, partly sectional view of the second preferred embodiment, illustrating how a post body of a fixed member is disposed within an upper tube of a connecting member.

With further reference to FIGS. 16 and 17, the fixed member 7 has a base portion 71 disposed inside of the C-shaped projection 611, a post body 72 extending upwardly from the base portion 71, and three angularly equidistant vertical ribs 73 extending from an annular outer surface of the post body 72. The base portion 71 of the fixed member 7 and the base body 61 of the base 6 have complementary engaging surfaces to prevent relative rotation thereof. The base portion 71 has a horizontal plate portion 74 disposed under the ring plate portion 621 of the retaining sleeve 62. The lower tube 8 includes a stop shoulder 81, an outward flange 82, and an internally threaded portion 83. The internally threaded portion 83 is disposed at an upper end of the lower tube 8. The stop shoulder 82 is disposed at an inner surface of the lower tube 8, and immediately under the internally threaded portion 83. The outward flange 82 extends radially and outwardly from a lower end of the lower tube 8, and is in slidable contact with the ring plate portion 621 of the retaining sleeve 62 and the horizontal plate portion 74 of the fixed member 7 so as to allow for rotation of the lower tube 8 relative to the base 6 while preventing vertical movement of the lower tube 8 relative to the base 6. The connecting member 9 includes a housing 91, a vertical upper tube 92 extending downwardly from the housing 91, and an internally threaded retaining ring 93. The upper tube 92 has a first externally threaded portion 921 and a second externally threaded portion 922 that is disposed at a lower end of the upper tube 92 and that is shorter than the first externally threaded portion 921. The flat display 30 is mounted to the housing 91 by a connecting unit 90. Because the structure of the connecting unit 90 is not pertinent to the claimed invention, a detailed description thereof is omitted herein for the sake of brevity. The upper tube 92 extends into the lower tube 8 along a height direction of the flat display 30. The first externally threaded portion 921 of the upper tube 92 engages the internally threaded portion 83 of the lower tube 8. Thus, the upper tube 92 is rotatable relative to the lower tube 8. In other words, the connecting member 9 is rotatable about the lower tube 8. The second externally threaded portion 922 of the upper tube 92 engages the retaining ring 93. An annular inner surface of the upper tube 92 is formed with three angularly equidistant vertical ribs 923. The ribs 73, 923 of the fixed member 7 and the upper tube 92 are alternately arranged.

During assembly of the display support device 60, the base portion 71 of the fixed member 7 is first placed into the C-shaped projection 611 of the base body 61 of the base 6 such that one of the ribs 73 of the post body 72 faces a rear end of the base body 61. Next, the retaining sleeve 62 is sleeved on the upper tube 8. The first externally threaded portion 921 of the upper tube 92 is engaged within the internally threaded portion 83 of the lower tube 8. The retaining ring 93 is sleeved on and engages the second externally threaded portion 922 of the upper tube 92 to prevent removal of the lower tube 8 from the upper tube 92. Subsequently, the front and rear retaining hooks 612, 612' are inserted respectively into the holes 625, 625' in the front and rear resilient plates 624, 624'. Hence, the outward flange 82 comes into contact with the ring plate portion 621 of the retaining sleeve 62 and the horizontal plate portion 74 of the fixed member 7.

Figure 18:
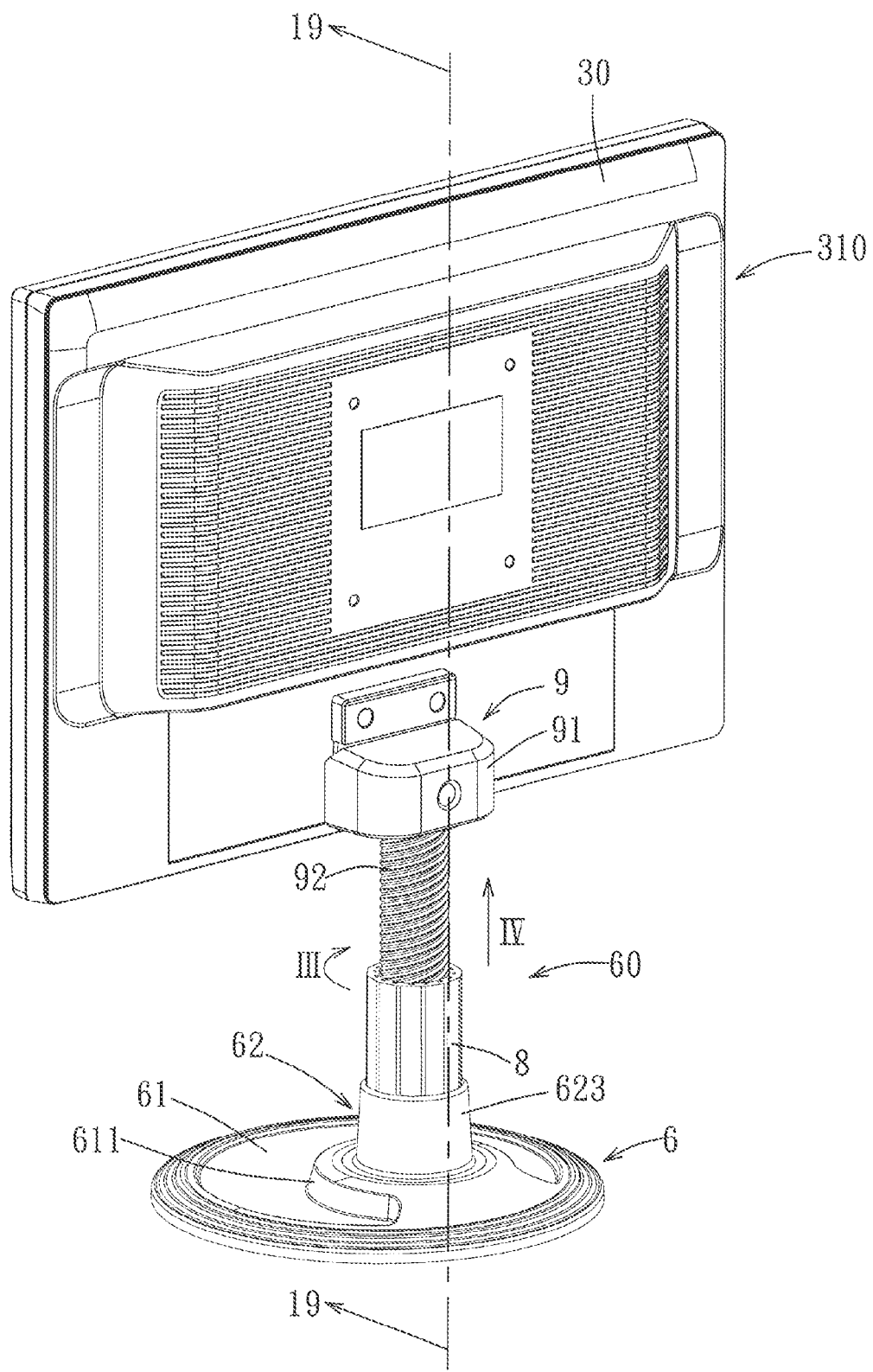
FIG. 18 is an assembled perspective view of the display apparatus of FIG. 12, illustrating how a retaining sleeve is operated to move the flat display upwardly relative to the base.
Figure 19:
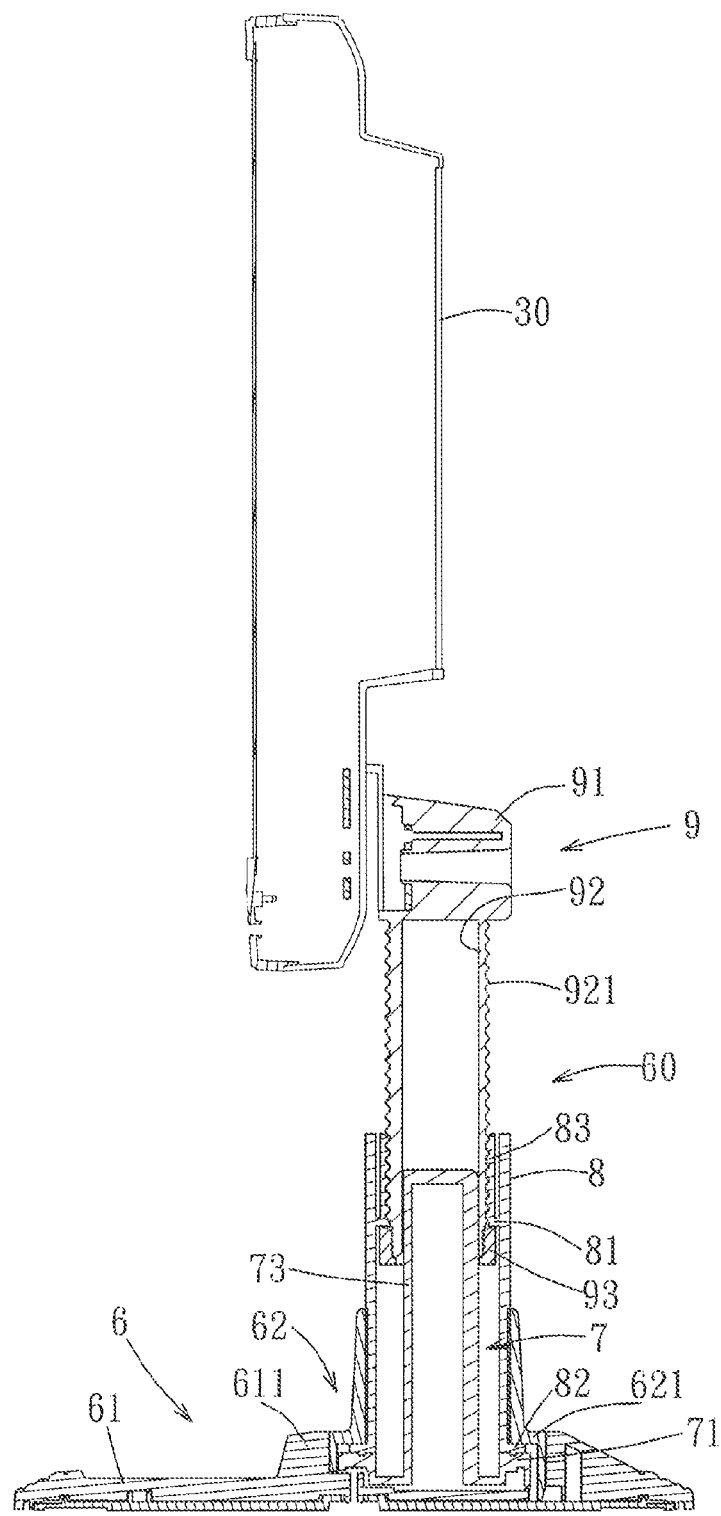
FIG. 19 is a sectional view taken along Line 19-19 in FIG. 18.

As such, with particular reference to FIGS. 18 and 19, when the lower tube 8 is rotated in a direction shown by the arrow (III) in FIG. 18, the upper tube 92 and, thus, the flat display 30 are moved relative to the base 6 in an upward direction shown by the arrow (IV) in FIG. 18. Conversely, when the lower tube 8 is rotated in an opposite direction, the flat display 30 is moved downwardly relative to the base 6. As s result, the height of the flat display 30 can be adjusted. During upward movement of the flat display 30, when the retaining ring 93 comes into contact with the stop shoulder 81 of the lower tube 8, further upward movement of the flat display 30 and, thus, removal of the upper tube 92 from the lower tube 8 are prevented.

Figure 20:
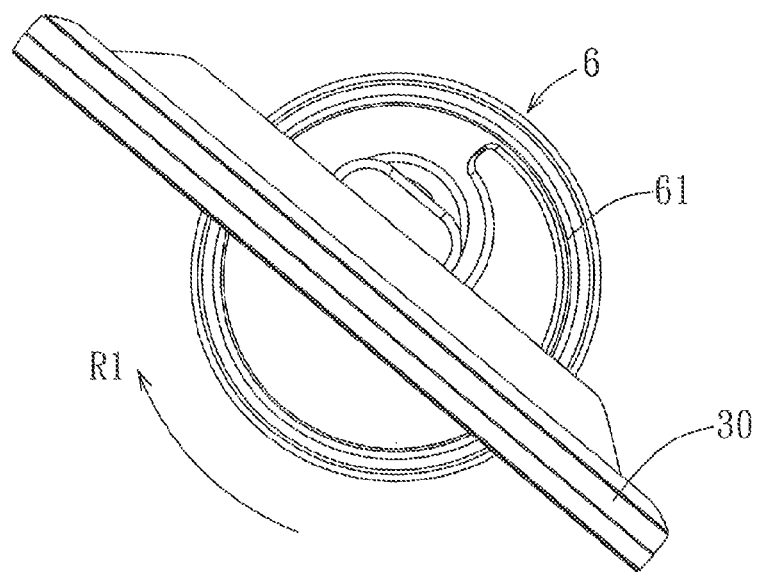
FIG. 20 is a top view of the display apparatus of FIG. 12, illustrating a clockwise rotation of the flat display.
Figure 21:
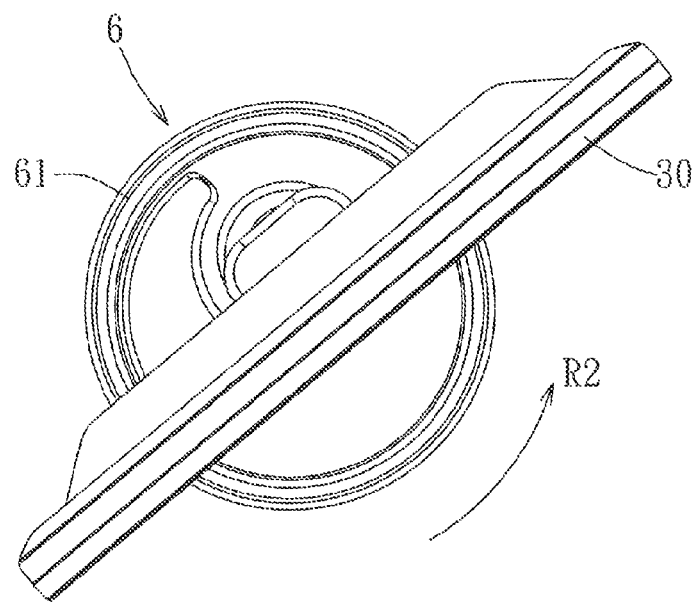
FIG. 21 is a top view of the display apparatus of FIG. 12, illustrating a counterclockwise rotation of the flat display.
Figure 22:
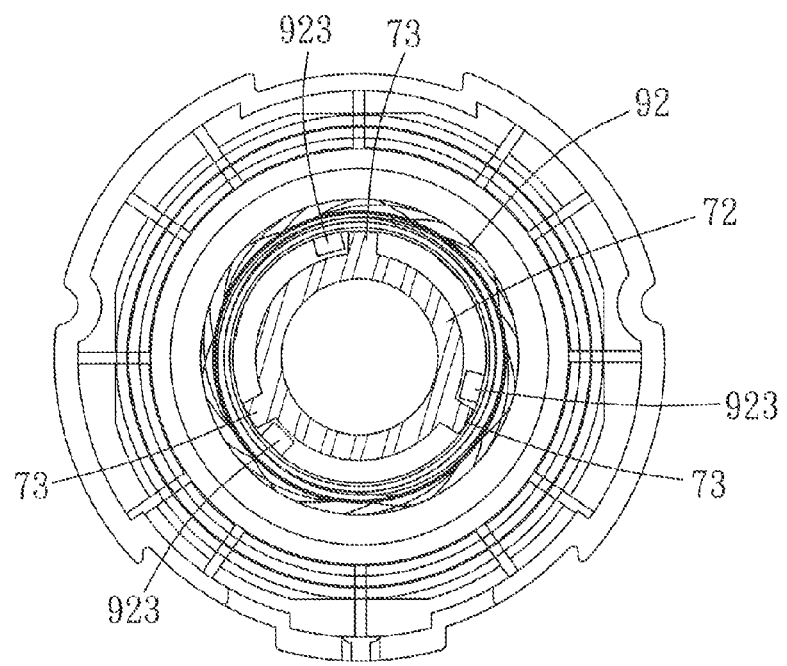
FIG. 22 is a view similar to FIG. 17 but illustrating how the rotational angle of the flat display is limited when the flat display is rotated clockwise.
Figure 23:
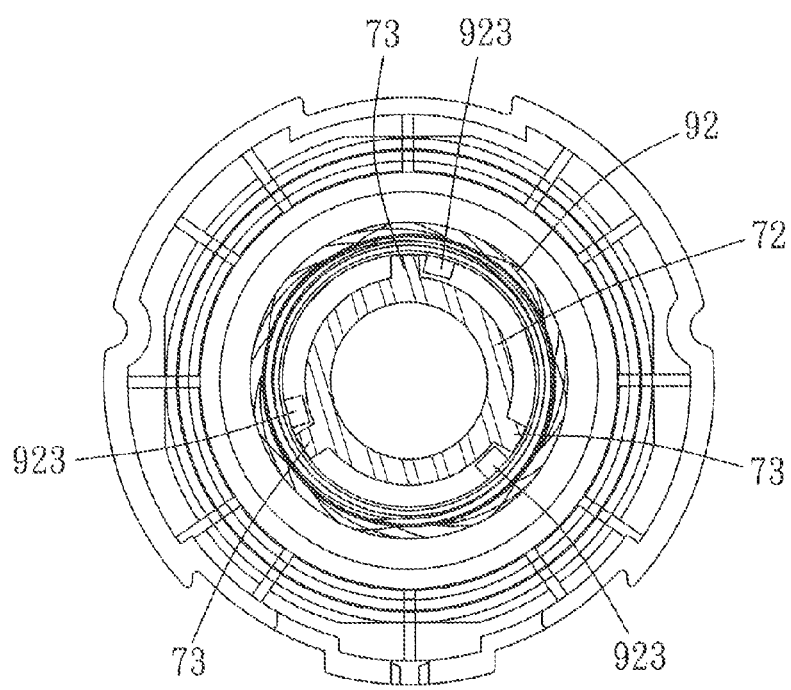
FIG. 23 is a view similar to FIG. 17 but illustrating how the rotational angle of the flat display is limited when the flat display is rotated counterclockwise.

Due to the presence of the ribs 73, 923, after assembly, when the flat display 30 is rotated by 60° in a clockwise direction as shown by the arrow (R1) in FIG. 20, the ribs 923 of the upper tube 92 come into contact with the ribs 73 of the fixed member 7, respectively, to thereby prevent further clockwise rotation of the flat display 30, as shown in FIG. 22. Alternatively, when the flat display 30 is rotated by 60° in a counterclockwise direction as shown by the arrow (R2) in FIG. 21, the ribs 923 of the upper tube 92 also come into contact with the ribs 73 of the fixed member 7, respectively, to thereby prevent further clockwise rotation of the flat display 30, as shown in FIG. 23. Therefore, the rotational angle of an assembly of the flat display 30 and the upper and lower tubes 92, 8 relative to an assembly of the base 6 and the fixed member 7 is limited to be no greater than 120°. In another embodiment, the post body 72 of the fixed member 7 has only two ribs 73 spaced apart from each other by a predetermined angle, and the upper tube 92 has only one rib 923 disposed between the ribs 73 of the post body 72.

With this invention thus explained, it is apparent that numerous modifications and variations can be made without departing from the scope and spirit of this invention. It is therefore intended that this invention be limited only as indicated by the appended claims.

We claim:

1. A display support device adapted for supporting an flat display, the flat display having a rear surface and being provided with a support frame disposed fixedly thereon, the support frame having a lower end placed on a support surface, said display support device comprising:
    a connecting member adapted to be mounted on the rear surface of the flat display and including an upper tube; and
    a lower tube disposed below said upper tube and having a lower end adapted to be placed on the support surface;
    wherein one of said upper and lower tubes has an internally threaded portion, and the other of said upper and lower tubes has an externally threaded portion engaging said internally threaded portion to allow for rotation and therefore movement of said lower tube relative to said upper tube, which results in a change in a total length of said upper and lower tubes to thereby adjust an inclination angle of the flat display;
    said upper and lower tubes being inclined, said upper tube being adapted to extend rearwardly and downwardly from the rear surface of the flat display;
    said upper tube having an externally threaded lower end constituting said externally threaded portion, and said lower tube has said internally threaded portion;
    said upper tube having a lower end wall formed with a hole therethrough, and said lower tube including a tube body, an insert rod formed integrally in said tube body, extending through said hole in said lower end wall of said upper tube, and having a distal end disposed within said tube body, and a retaining member mounted removably to said distal end of said insert rod to prevent removal of said insert rod from said lower end wall of said upper tube.

2. The display support device as claimed in claim 1, wherein said connecting member includes a first mounting seat adapted to be disposed on the rear surface of the flat display, and a second mounting seat connected removably to said first mounting seat.

3. The display support device as claimed in claim 2, wherein said first mounting seat has a positioning hole, and said second mounting seat includes an integral resilient plate, and a pushbutton disposed fixedly on said resilient plate, extending into said positioning hole in said first mounting seat so as to prevent removal of said second mounting seat from said first mounting seat, and operable to separate from said positioning hole in said first mounting seat so as to allow for removal of said second mounting seat from said first mounting seat.

* * * * *